United States Patent [19]

Ichimiya et al.

[11] 4,043,310
[45] Aug. 23, 1977

[54] AUXILIARY APPARATUS FOR HOT-STARTING INTERNAL COMBUSTION ENGINE

[75] Inventors: Touru Ichimiya; Koichi Oosawa, both of Shizuoka, Japan

[73] Assignee: Toyota Jidosha Kogyo Kabushiki Kaisha, Toyota, Japan

[21] Appl. No.: 586,032

[22] Filed: June 11, 1975

[30] Foreign Application Priority Data

Feb. 18, 1975 Japan .................................. 50-20233

[51] Int. Cl.² ............................................. F02N 17/00
[52] U.S. Cl. ........................... 123/179 G; 123/119 D; 123/124 R
[58] Field of Search .......... 123/119 D, 124 R, 124 A, 123/179 R, 179 A, 179 G

[56] References Cited

U.S. PATENT DOCUMENTS

| | | | |
|---|---|---|---|
| 2,230,184 | 1/1941 | Horton | 123/179 G |
| 3,043,286 | 7/1962 | Blomberg | 123/124 B |
| 3,534,720 | 10/1970 | DuBois | 123/179 R |
| 3,577,966 | 5/1971 | Collingwood | 123/119 D |
| 3,641,767 | 2/1972 | Kraus et al. | 123/124 R |
| 3,866,588 | 2/1975 | Nakada et al. | 123/119 D |

*Primary Examiner*—Carroll B. Dority, Jr.
*Assistant Examiner*—David D. Reynolds
*Attorney, Agent, or Firm*—Stevens, Davis, Miller & Mosher

[57] ABSTRACT

Auxiliary apparatus for hot-starting an internal combustion engine includes a secondary air injection nozzle opened in the intake manifold, and a heat sensitive solenoid valve to control the supply of secondary air from an air source to the nozzle. When hot-starting the engine with the engine temperature exceeding a predetermined level, the valve opens to supply a jet of air into the intake manifold through the nozzle so that a too rich mixture gas likely to be produced in the manifold is made leaner, thus reducing the output of unburned, harmful ingredients of exhaust gas from the engine as well as improving the startability of a hot engine.

6 Claims, 2 Drawing Figures

AUXILIARY APPARATUS FOR HOT-STARTING INTERNAL COMBUSTION ENGINE

BACKGROUND OF THE INVENTION

This invention generally relates to an auxiliary apparatus for hot-starting an internal combustion engine, and more specifically to such apparatus of the type which while preventing objectionable exhaust of unburned, harmful ingredients of combustible fuel, avoids lowering of engine startabilities caused by a known phenomenon "percolation" that after having stopped the engine of high temperature, some fuel from the carburetor tends to spout into the intake line.

Generally, for the purpose of reducing the amount of harmful chemical substances such as CO, HC, etc. contained in exhaust gases from an automobile engine, there has been known an arrangement wherein secondary air is supplied into the flow of exhaust gas adjacent the exhaust valve on the cylinder head so that unburned ingredients such as CO, HC, etc. carried in the flow of exhaust gas can be burned up, by the secondary air, within a thermal reactor provided downstream from the port wherefrom the secondary air is jetted.

The thermal reactor is usually disposed within the engine room, and therefore the carburetor and other auxiliary equipments will be heated up to high temperatures due to heat transfer from not only the engine but also the thermal reactor where burnings of CO, HC, etc. take place.

In general, the percolation phenomenon is liable to occur in the fuel supply line especially when the engine is brought to a stop with the carburetor being maintained in a high temperature state. Namely, during the engine operation, the interior of the carburetor's float chamber is kept in a state of relatively high temperature and high pressure. As this state remains still for a certain hours even after the engine having stopped, a portion of fuel in the float chamber will be forced out from a main nozzle of the carburetor into the intake line of the engine. The thus expelled portion of fuel, as the engine temperature is gradually lowered, tends to be liquidized and adhere onto the inner wall of the intake manifold.

As long as the engine temperature is high, however, particularly with the engine structure of the type wherein the intake manifold is arranged extending adjacent the exhaust manifold to facilitate heat exchange between both manifolds, such portion of expedded fuel will remain within the intake manifold in the gaseous state under the influence of heat thereat. As a result, the mixture gas in the intake manifold is too rich. Under these conditions, therefore, even if the engine is cranked for starting, there will hardly be smooth starting because of the inferior ignitibility of such rich mixture. Even if the engine is started, unburned ingredients e.g. HC, CO, etc. are undesirably increased in amount.

SUMMARY OF THE INVENTION

This invention, therefore, has a primary object to solve the above undesirable problem by providing an auxiliary apparatus for hot-starting an engine which comprises: a secondary air injection nozzle opened for an intake passage; a secondary air supply source; a secondary air supply conduit connecting between said secondary air supply source and secondary air injection nozzle; a valve means disposed between said secondary air supply conduit and secondary air injection nozzle, for closing or opening communication between said conduit and nozzle; an electromagnetic valve having a solenoid coil for actuating said valve means; an input circuit for said solenoid circuit; a thermoswitch connected to said input circuit and adapted to be made on only when the temperature of the intake passage exceeds a predetermined level; and a starter motor switch connected to said input circuit in series with the thermoswitch and adapted to be made on only when the engine is cranked for starting.

In an engine equipped with an auxiliary apparatus of the invention, the above described prior art disadvantages will be eliminated, namely according to the invention, the electromagnetic valve opens only when the starter motor is driven with the engine temperature exceeding a predetermined level, and supplies secondary air into the intake passage to make a too rich mixture leaner so that starting the engine is made easy while the amount of unburned ingredients of fuel in the exhaust is reduced.

The invention will now be described of its preferred embodiments with reference to the accompanying drawings.

DETAILED DESCRIPTION OF THE INVENTION

Figure 1:
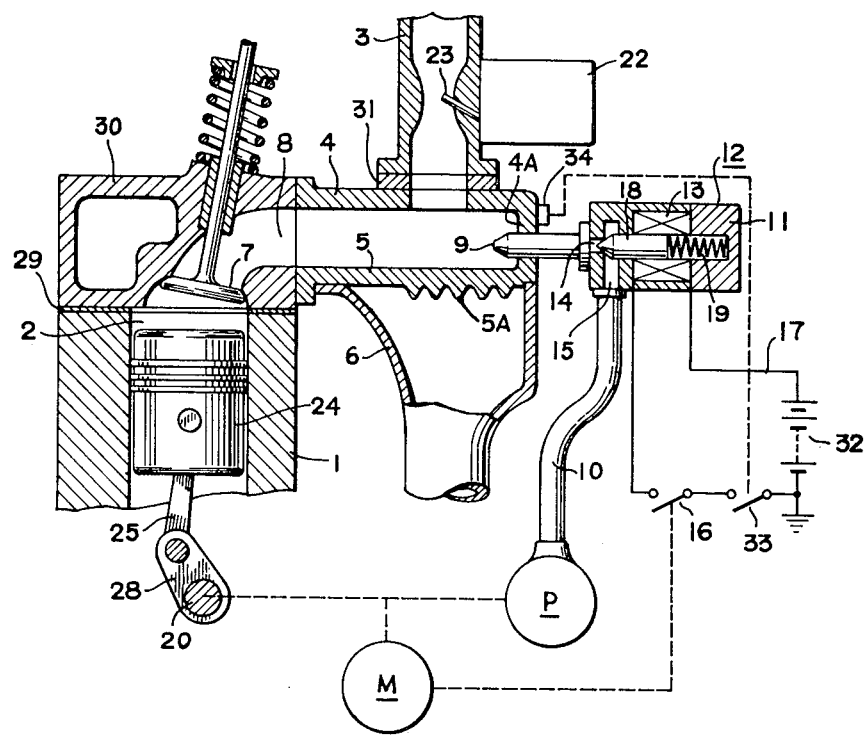
FIG. 1 is a sectional view inclusive of circuit diagrams showing an auxiliary apparatus for hot-starting an engine according to an embodiment of the invention.

As shown in FIG. 1, a piston 24 is disposed as usual for reciprocal movement in a cylinder bore 2 formed in a cylinder block 1. Also, the piston 24 is in operative association with a crankshaft 20 through a connecting rod 25 and crank arm 28. On the cylinder block 1, is fixed a cylinder head 30 through a packing sheet 29, also as conventional, which head 30 provides therein an intake port 8 and an exhaust port (not shown) both in communication with the cylinder bore 2. These ports are provided with an intake valve 7 and an exhaust valve (not shown), respectively.

Further, also as conventional, the cylinder head 30 connects thereto an intake manifold 4 in communication with the intake port 8, and an exhaust manifold 6 communicating with the exhaust port (not shown). To the intake manifold 4, is connected an intake pipe 3 through a packing sheet 31, which intake pipe 3 in turn is connected to a carburetor 22. The carburetor 22 has a fuel injection nozzle or main nozzle 23 with its nozzle end being exposed in the intake pipe 3.

As shown, the bottom wall 5 of the intake manifold 4 forms the upper wall of the exhaust manifold 6, namely the wall 5 defines boundaries between the two manifolds. This bottom wall 5 of the intake manifold 4 forms a heat exchange portion 5A which serves to preheat the intake air-fuel mixture by heat of the exhaust gas.

An intake pipe 3 is mounted on the intake manifold 4 of which the end wall 4A is provided with a secondary air injection nozzle 9 fixed thereto and directed toward the intake port 8. The intake pipe 3 is preferably located at a position spaced apart from the outer end wall 4A. The secondary air injection nozzle 9 does not interfere with an intake mixture gas flow produced within the intake manifold because the nozzle 9 is located at the retracted position from the intake passage. Smooth or uninterrupted flow of the air injected from the nozzle 9 toward the intake port 8 is ensured via the intake manifold 4.

The outer end of the secondary air injection nozzle 9 is connected to a body portion 11 of an electromagnetic valve means 12. A valve bore 14 is formed in one end of the body portion 11 in communication with the secondary air injection nozzle 9, and a passage 15 communicating with the valve bore 14 is formed. To the valve body 12, is connected an air supply pipe 10 with one end in communication with the passage 15 and the other end connected to a secondary air source such as an air pump P. It is arranged that the air pump P is driven either by the crankshaft 20 via suitable mechanical means or by a starter motor M.

Further, the valve 12 has a valve rod 18 for reciprocable movement to open or close the opening of the valve bore 14. Around the valve rod 18 is disposed a solenoid coil 13, and the valve rod 18 serves also as an armature for the solenoid coil 13. The valve body portion 11 also has a spring 19 housed in a recess formed in the body in such manner that the valve rod 18 is normally urged against the valve seat of the bore 14. However, when the solenoid coil 13 is energized, the valve rod 18 is moved to the right, as viewed in FIG. 1 against the expanding force of the spring 19.

For actuation of the valve, there is provided an input circuit 17 connected to the solenoid coil 13, which input circuit 17 includes a battery 32, a thermoswitch 33 and a starter motor switch 16 in series.

The above thermoswitch 33 is actuated by a bimetal switch which is sensitive to temperature changes occurring in the intake manifold 4 or engine room, or by a thermosensor 34 mounted on the outer wall of the intake manifold 4. The thermoswitch 33 is adapted to be closed when the intake manifold 4 exceeds in temperature the evaporating point of the fuel. The above starter motor switch 16 is either connected to an input circuit of the starter motor M or operatively associated with the starting switch (not shown) of the starter motor M.

The apparatus of the invention will now be described of its operation.

When the engine is brought to a stop after a certain period of operation, the phenomenon known as percolation will take place in the fuel supplying system on account of high temperatures accumulated in the engine room so that a portion of fluid fuel from a float chamber (not shown) of the carburetor 22 spouts into the intake pipe through the main nozzle 23. This spout of fluid fuel reaches into the intake manifold 4 where, under the influence of remaining heat in the manifold 4, heat transfer from the cylinder block 1 and exhaust manifold 6, the fluid fuel is heated up to be gasified.

As the result of the percolation, the intake manifold 5 and intake pipe 3 become full of too rich mixture gases. Therefore, if the engine is cranked for starting under this condition, a smooth engine start is hardly attainable because that non-ignitable, too rich mixture gases are drawn into the cylinder bore (combustion chamber) 2.

According to the present arrangement, however, whenever the intake manifold reaches such temperatures high enough to evaporate the fuel, the thermoswitch 33 in response will be made on. With this thermoswitch 33 being closed, the starter motor switch 16 is closed so that the starter motor M is actuated to start cranking of the engine, while at the same time the circuit 17 is closed thereby to energize the solenoid coil 13 through the battery 32.

When the solenoid coil 13 is energized, the valve rod 18 in the electromagnetic valve 12 is pulled rightwards, as viewed in FIG. 1, against the spring 19, so that the secondary air injection nozzle 9 comes into communication with the air supply pipe 10 through the valve bore 14 and passage 15. On the other hand, upon the start of cranking the engine the air pump P also is driven to feed compressed air into the pipe 10 as a supply of secondary air. This secondary air then is forced through the passage 15 and opened bore 14, and is jetted from the secondary air injection nozzle 9 into the intake manifold 4 directing toward the intake port 8. The secondary air thus spouted from the nozzle 9 mingles with the too rich mixture gas in the intake manifold 5 so that the latter is thinned into a mixture of appropriate richness or air-fuel ratio. It now is made possible, therefore, to start the engine within shorter hours of cranking.

After starting the engine, the starter motor switch 16 is made off to break the circuit 17 so that the solenoid 13 in the valve 12 is demagnetized. Hence, the valve rod 18 again closes the valve bore 14 under the biasing force of the spring 19, and thus a further supply of secondary air jet from the nozzle 9 will be interrupted.

Thereafter, the engine will be operated in the ordinary fueling manner, namely the engine cylinder is supplied through the intake manifold 5 with mixture gases of fuel from the carburetor 22 and air from the intake pipe 3. It is to be noted that the flow of mixture gas will never be distrubed by the secondary air injection nozzle 9 since the nozzle 9 is located at the outer end of the intake manifold 5 or apart from the flow course of the mixture gas.

Figure 2:
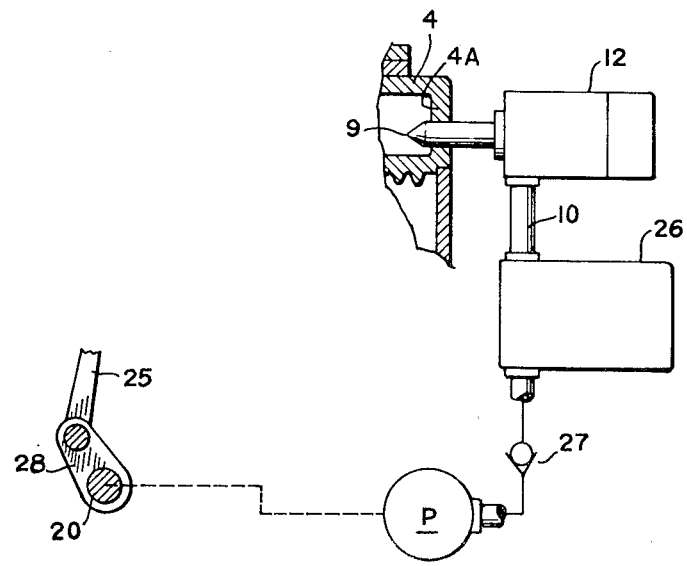
FIG. 2 is a similar view however showing an alternative embodiment of the invention.

In the above embodiment, the secondary air injection nozzle 9 has been described as is to be supplied with compressed air from the air pump P only when the pump is actuated. However, it may alternatively be arranged, as shown in FIG. 2, that the air pump P is connected to an accumulator 26 wherethrough secondary air is fed to the secondary air injection nozzle 9. This accumulator is in the ordinary form for gas accumulation, and during the engine operation, the accumulator is charged with compressed air from the pump P in operative association with the crankshaft. With this arrangement, when the starter motor is actuated under high engine temperature conditions, the electromagnetic valve 12 is operated in the manner described previously with reference to FIG. 1, so that the compressed air stored in the accumulator spouts from the nozzle 9 immediately upon such actuation of the valve. Due to the fact that air injection is effected right immediately after the actuation of the valve 12, it will advantageously be made possible to further reduce the length of time required for starting the engine. In this accumulator arrangement there is provided a check valve 27 between the pump P and the accumulator, which check valve serving to prevent a reverse flow of compressed air from the accumulator 26 to the pump P.

In the above embodiment, the secondary air injection nozzle 9 has been described as disposed through or on the outer end wall 4A of the intake manifold 4, however the location of the nozzle 9 is not limited to the interior of the intake manifold 4, but may alternatively be located at any preferred points along the intake passage composed of the intake pipe 3 and intake manifold 4, with a view of achieving the object that for hot-starting the engine excess air be added to the intake air.

What is claimed is:

1. An auxiliary apparatus for hot-starting an engine comprising:
   an intake manifold, said manifold having an opening in one end thereof and being directly connected to an intake port opening into a cylinder at the other end thereof;
   an intake pipe opening into said intake manifold, at an intermediate portion thereof between and spaced from said ends thereof;
   a secondary air injection nozzle having one end extending through said opening in said one end of said manifold and terminating in the space between said intake pipe and said one end of said manifold whereby said nozzle will not interfere with intake flow from said intake pipe;
   an air pump for supplying pressurized secondary air to said secondary air injection nozzle;
   a secondary air supply conduit for fluidly communicating said air pump and said secondary air injection nozzle;
   an electromagnetic valve comprising:
   a body having an opening in one end thereof, the other end of said nozzle being in direct fluid communication with said opening in said body;
   a valve means disposed between said secondary air supply conduit and said secondary air injection nozzle for opening and closing fluid communication between said conduit and said nozzle through said opening in said body, and
   a solenoid coil for actuating said valve means; and
   means for operating said solenoid coil to actuate said valve means only when the temperature of the intake passage exceeds a predetermined level and only at the time of cranking the engine, said operating means comprising:
   an input circuit for said solenoid coil,
   a thermoswitch electrically connected to said input circuit, and
   a starter motor switch electrically connected to said input circuit in series with the thermoswitch.

2. An auxiliary apparatus for hot-starting an engine according to claim 1, wherein the intake manifold extends adjacent an exhaust manifold to facilitate heat exchange between both manifolds.

3. An auxiliary apparatus for hot-starting an engine according to claim 2, wherein said secondary air injection nozzle opens in a direction toward said intake port of said engine along a heat exchanging portion between said intake and exhaust manifolds.

4. An auxiliary apparatus for hot-starting an engine according to claim 1, wherein said air pump is operatively associated with the engine.

5. An auxiliary apparatus for hot-starting an engine according to claim 1, wherein said air pump is operatively associated with a starter motor.

6. An auxiliary apparatus for hot-starting an engine according to claim 1, further comprising an accumulator for storing compressed air from said air pump in operative association with the engine.

* * * * *